Dec. 5, 1950   S. H. BOBROV   2,532,596
TAPE DISPENSER AND APPLIER
Filed Jan. 20, 1948   3 Sheets-Sheet 1
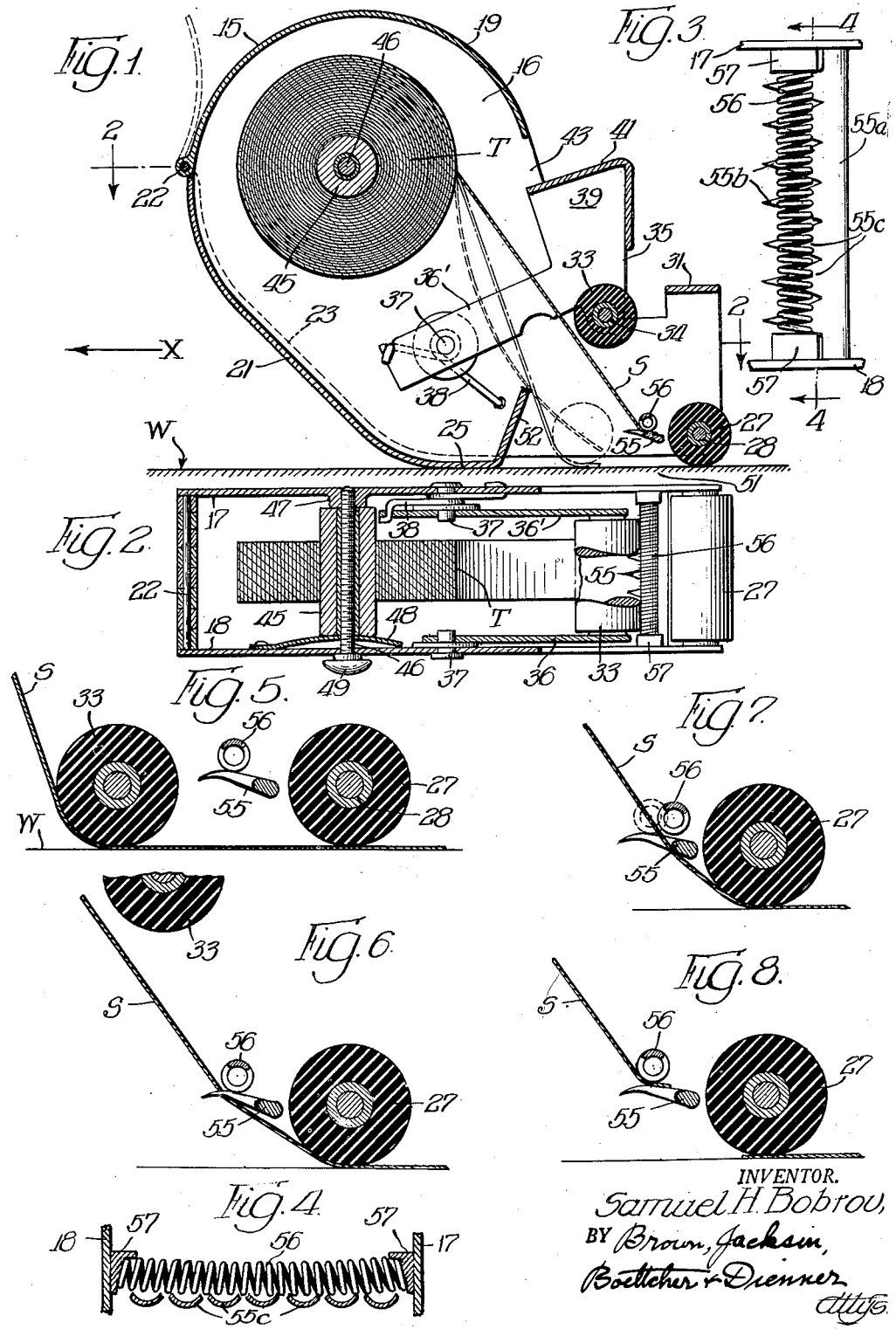
INVENTOR.
Samuel H. Bobrov,
BY Brown, Jackson,
Boettcher + Dienner
Attys.

Dec. 5, 1950 S. H. BOBROV 2,532,596
TAPE DISPENSER AND APPLIER
Filed Jan. 20, 1948 3 Sheets-Sheet 2
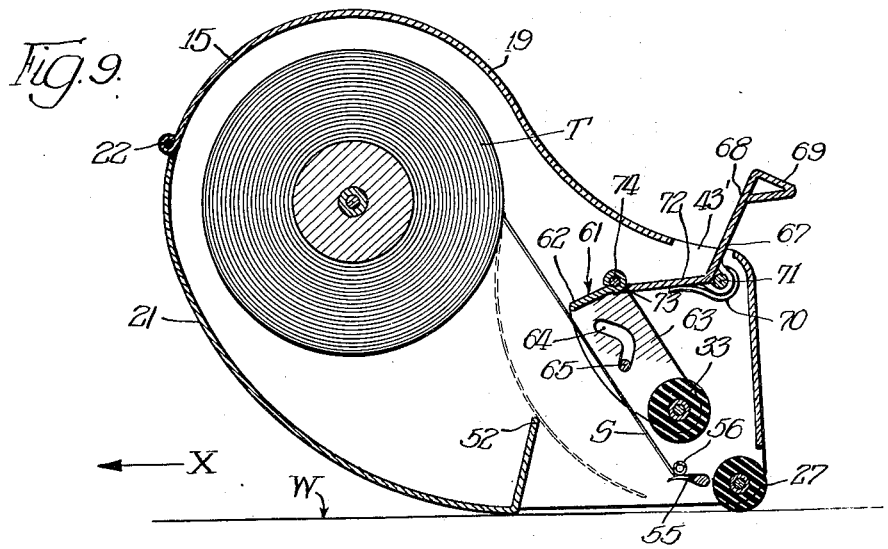
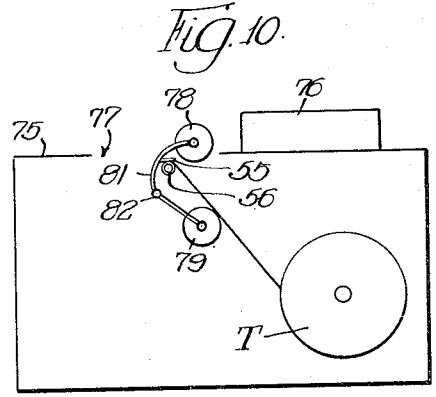
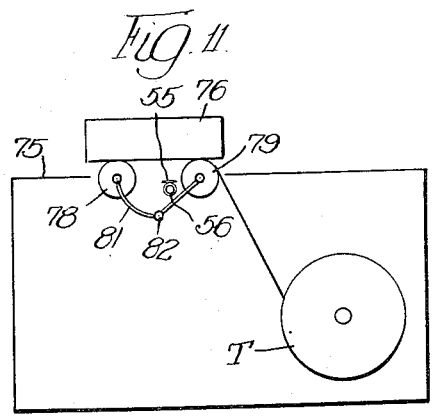
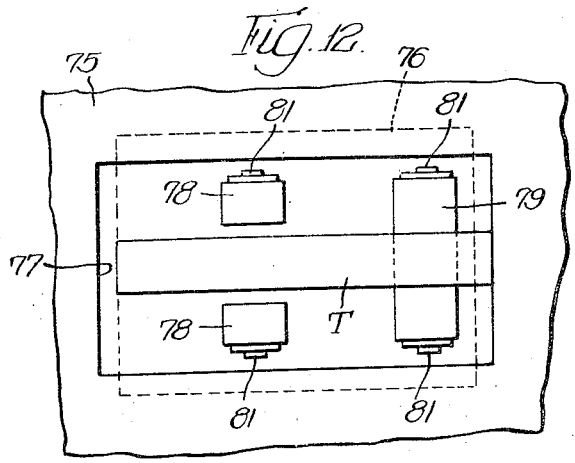
INVENTOR.
Samuel H Bobrov,
BY Brown, Jackson,
Boettcher & Dienner
Attys

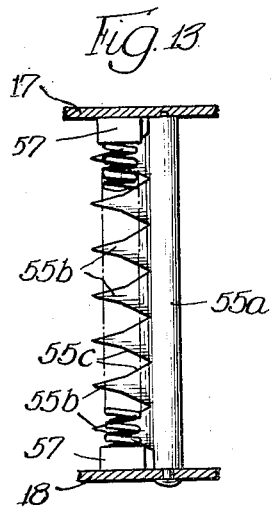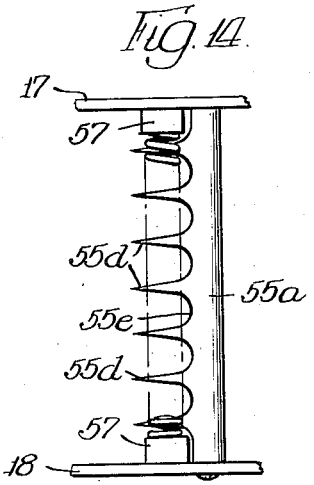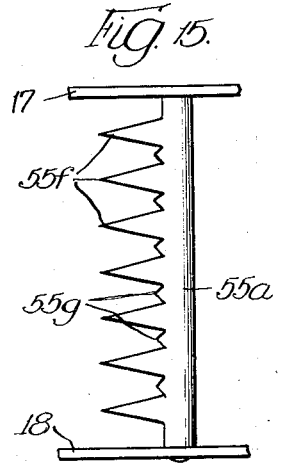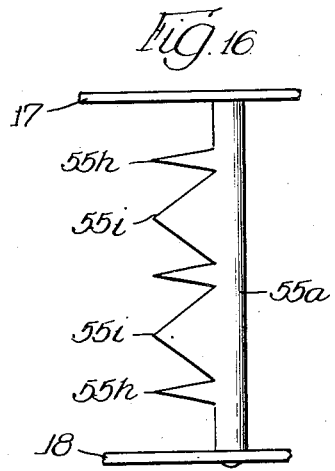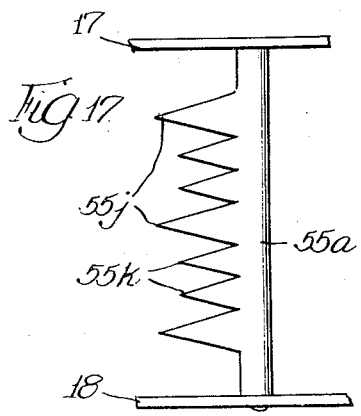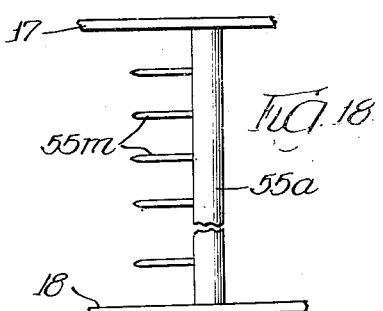

Patented Dec. 5, 1950

2,532,596

UNITED STATES PATENT OFFICE 2,532,596

TAPE DISPENSER AND APPLIER

Samuel H. Bobrov, Chicago, Ill.

Application January 20, 1948, Serial No. 3,315

5 Claims. (Cl. 216—33)

My invention relates to an improved machine for applying adhesive tape. Machines of this type are of particular utility for the wrapping or tying of packages and the like, but these machines also have widespread utility in innumerable other situations where adhesive tape is to be applied to a surface or article.

My improved machine has been devised primarily for applying adhesive tape of the so-called "Scotch" type, i. e. tacky tape having a plastic adhesive coating that remains permanently tacky and does not have to be moistened. Because of the permanently tacky nature of this plastic adhesive coating, problems are introduced in a machine for applying this "Scotch" type of tape that are not encountered in a machine for applying the conventional gummed type of tape. Thus the use of guides or channels are either not applicable with Scotch tape or too complicated in application. One of the objects of my invention is to provide a machine which meets these problems in applying "Scotch" tape. A principal object of my invention is to provide a machine which performs all functions of tape applying, tape cutting and retaining of cut supply end in position for further taping without direct manual contact with the tape and without lifting the machine from the work surface until all these functions are completed. However, the invention is also characterized by improved features which can be embodied in machines for applying the gummed type of tape.

One of the principal features of the invention is the provision of improved tape-cutting means for automatically cutting the tape at the conclusion of the taping operation. This cutting means is characterized by a plurality of laterally spaced, sharp, penetrating points considerably longer than commonly employed for such purpose and which by virtue of their greater length first penetrate the tape substantially following which movement of the tape relative to the cutting means causes the tape to be severed when the cutting points have penetrated the tape still further to the base areas of the teeth. This cutting means is arranged to act on a tension span of the moving tape, this tension span being held away from the cutting means during the operation of applying tape to the working surface, and this tension span being then allowed to impale itself upon the sharp, penetrating points of the cutting device when the cutting operation is to be performed.

Another feature of the invention resides in improved holding means for holding the supply end of the tape leading from the supply roll after the cutting operation. An important purpose of this holding means is to hold the cut end of the tape supply in a predetermined fixed position which is readily available for the starting of future taping with the tape applying means employed. This improved holding means also prevents the supply end of the tape from accidentally contacting the work surface during the cutting operation, or immediately thereafter. The improved holding means also prevents the supply portion of the tape from contacting and adhering to other surfaces in the machine, which might interfere with or foul the subsequent operation of the machine. This pressure sensitive type of adhesive tape is so tacky and so quick to adhere to any surface with which it has even the slightest contact that it is extremely important that the cutting means and holding means function reliably in such manner that the adhesive side of the tape leading from the supply roll shall not accidentally adhere to the work surface, or to other surfaces in the machine itself which might cause fouling of the machine.

Another feature of the invention resides in improved pressure applying means for moving the supply end of the tape into adhesive contact with the work surface, for thereafter holding the tension span of the tape away from the cutting means during the tape applying operation, and for then allowing this tension span of the tape to impale itself upon the sharp points of the cutting device when it is desired to sever the tape at the end of the tape applying operation.

Another feature of the invention is that the length of tape applied to the work surface can be varied at will by the operator within the limits of the amount of tape contained in the supply roll.

Other objects, features and advantages of the invention will appear from the following detailed description of several preferred embodiments of my invention. In the accompanying drawings illustrating such embodiments:

Figure 1 is a vertical sectional view through a portable embodiment of my invention of the type adapted to be moved over the work surface in the operation of applying the adhesive tape thereto;

Figure 2 is a horizontal sectional view taken approximately on the broken plane of the line 2—2 of Figure 1;

Figure 3 is a fragmentary detail view of the cutting and holding means on a larger scale;

Figure 4 is a transverse sectional view taken approximately on the plane of the line 4—4 of Figure 3;

Figure 5 is a diagram showing the tape being pressed into contact with the work surface by the tape applying roll in the tape applying operation;

Figure 6 is a similar diagram of the first step in the cutting operation after the tape applying roll has been swung upwardly to terminate the tape applying operation, showing the tension span of the tape leading from the supply roll to the work surface just beginning to impale itself on the penetrating points of the cutting device;

Figure 7 is a further diagram of the cutting operation showing the next step wherein the tape has just severed itself on the cutting device, and the trailing end of the applied strip is being rolled down upon the work surface;

Figure 8 is a final diagram of the completion of the cutting operation, showing the trailing end of the applied strip rolled down upon the work surface by the tape pressing roll, and showing the leading end of the supply strip caught and held between the top side of the cutting teeth and the under side of the holding spring;

Figure 9 is a view similar to Figure 1 showing a modified construction of the portable type of my invention;

Figures 10 and 11 are diagrammatic vertical sectional views through a stationary embodiment of my improved tape applying device wherein the package or article to which the tape is to be applied is passed over the tape applying device;

Figure 12 is a diagrammatic plan view of this latter embodiment; and

Figures 13 to 18, inclusive, are views similar to Figure 3 showing different forms and arrangements of cutting teeth which may be used in the portable embodiment of Figures 1, 2 and 9 or in the stationary embodiment of Figures 10, 11 and 12.

In the portable embodiment of the invention shown in Figures 1 to 8, inclusive, the several parts are all carried by a movable housing 15 which is adapted to apply the adhesive tape by being propelled over the work surface W in the direction of the arrow X. The forward upper part of the housing 15 defines a substantially cylindrical compartment 16 for receiving the supply roll of adhesive tape T. As shown in Figure 2, the sides of the housing are defined by two parallel side walls 17 and 18, which side walls are joined at the top by the semicircular top wall 19 which is integral with or fixedly secured to the side walls 17 and 18. The forward lower portion of the housing is provided with a swinging cover 21 which has a hinged connection 22 at its upper end with the transverse lower edge of the semicircular wall 19. The side margins of the cover 21 are formed with overhanging lips or marginal flanges 23 which embrace the sloping forward margins of the side walls 17 and 18. This hinged cover 21 can be swung upwardly approximately to the open position indicated in dotted lines in Figure 1, so as to permit the introduction of a new supply roll of tape T when the previous roll has become depleted. The bottom end of the cover 21 is curved inwardly and horizontally on a gradual curve to form a sliding bearing surface 25 which functions as a runner for slidably supporting the forward portion of the casing on the work surface when the device is pushed in the direction of the arrow X in the operation of applying the tape to the work surface. The rear end of the housing 15 is supported on the work surface through the medium of a pressing roller 27 which is rotatably mounted on the bearing shaft 28 having its ends mounted in the side walls 17 and 18. This pressing roller 27 is preferably composed of rubber, pressed cork, or other suitable material, preferably slightly yieldable in nature, adapted to exert downward pressure on the applied strip of adhesive tape for insuring adhesive contact of the entire surface of the tape with the work surface. The use of a rotating pressure roller 27 is preferably for supporting the rear end of the unit, but the roller can be substituted by a sliding runner or shoe formed as a fixed part of the housing, if such construction is desired. Above the roller 27 is a horizontal connecting plate or bridge 31 which extends transversely between the side walls 17 and 18 and is suitably secured thereto for holding these ends of the side walls in fixed spaced relation. In the use of the device this bridge 31 also functions as a finger rest on which the operator can exert a downward and forward pressure for propelling the device forwardly, and concurrently exerting a downward pressure upon the applied strip of tape through the medium of the roller 27.

Disposed forwardly of the pressing roll 27 is the tape applying roll 33 arranged for substantially vertical swinging movement toward and away from the work surface W. This latter roll is pivotally mounted upon a horizontal bearing shaft 34 which has its ends mounted in a swinging bearing frame 35. Said frame has laterally spaced forwardly extending side arms 36, 36' which have pivotal mounting on the inner sides of the housing walls 17 and 18 on pivot pins or rivets 37. The side arm 36' (Figure 2) is extended somewhat beyond its adjacent rivet 37 for effecting attachment with one end of a torsion spring 38 which is wrapped around such pivot pin and has its other end anchored to the housing wall 17. Said torsion spring tends constantly to swing the frame 35 and tape applying roller 33 upwardly to the normal position shown in Figure 1. The swinging frame 35 also comprises upwardly extending arm portions 39 at each side which are joined by a transverse presser plate 41 extending across the tops and down the rear edges of these arm portions 39. This presser plate and adjacent portions of the swinging frame are adapted to swing upwardly through an opening 43 which is defined in the top of the housing between the semicircular top wall 19 and the transverse bridge bar 31. In the operation of the device the operator's fingers rest upon the presser plate 41 so as to apply downward pressure thereto for swinging the tape applying roll 33 from its normal upper position, shown in full lines, into its lower tape applying position, shown in dotted lines. Such downward motion of the tape applying roll carries the supply end of the tape down into pressure contact against the work surface W, indicated by the dash and dot line position of the tape, as will be later described.

The roll of adhesive tape is mounted upon a spool or core 45 which rotates with the roll. As shown in Figure 2, a removable mounting spindle 46 is adapted to be inserted through an aperture in the side wall 18 for passing through the spool 45, this mounting spindle having a threaded end which is adapted to screw into a threaded boss 47 provided on the opposite housing wall 17. A leaf spring 48 has one end anchored to the housing wall 18 and has its other end apertured to fit over the spindle 46, this leaf spring exerting lateral pressure between the housing wall and the adjacent end of the spool 45, so as to maintain a friction drag against rotation of the spool and of the supply roll of tape T. If desired, the mounting spindle 46 may be arranged so that it can be screwed inwardly or outwardly through rotation of the outer head 49 to adjust the friction drag pressure of the spring 48 against the end of the spool 45. For inserting a new roll of adhesive tape into the machine, the swinging cover portion 21 is swung upwardly to its open position, indicated in dotted lines, and the mounting spindle 46 is removed for mounting a new roll of tape thereon. Because the adhesive tape has a tacky under surface, it does not unreel freely from the supply roll, but must always be pulled from the supply roll under tension. This means that the downwardly extending supply end S of the tape does not unreel from a point tangential to the upper or outer surface of the supply roll, but instead this supply end S pulls loose from the roll at a lower point than the tangential point, this being clearly illustrated in Figure 1. The friction drag of the leaf spring 48 also augments this action. The supply end S of the tape is adapted to be carried down into engagement with the work surface W through a tape applying opening 51 in the bottom of the housing. The rear end of this opening 51 is defined more or less by the presser roll 27, and the front end of said opening is defined by the upwardly extending flange or end wall 52 formed at the swinging end of the hinged cover 21. The upper edge of the flange 52 defines a rest or limiting stop against which the under side of the adhesive tape is adapted to engage if the supply end of the tape should accidentally become loosened from the cutting and holding device, to be later described. If desired, this limiting stop or rest 52 may be formed as a stationary strut, bar, pin or the like extending between and rigidly secured to the side walls 17 and 18 of the housing. The construction and arrangement of this limiting stop is such that the tacky under surface of the adhesive tape will have a minimum area of contact with said limiting stop if the tape should become loosened from the cutting and holding device and swing forwardly into engagement with the limiting stop. Such a position of the tape is indicated approximately by the curved dotted line position shown in Figure 1. If the supply end of the tape should accidentally swing into this loosened or free position, the tape applying roll 33 is still capable of engaging the outer side of the tape for bringing the tacky surface of the tape down into engagement with the work surface in a tape applying operation.

Referring now to my unique automatic cutting and holding device which cuts the tape at the completion of the tape applying operation and holds the cut end or supply end of the tape in readiness for the next tape applying operation; such device comprises a penetrating and shearing cutter 55 and a spring acting holder 56. This cutting and holding device is preferably positioned just above and adjacent to the rear end of the tape applying opening 51, at a point just forwardly of the tape pressing roll 27. This is the preferred location of the cutting and holding device, but such location is not essential. In its preferred form, the penetrating and shearing cutter 55 is in the form of a stationary cutter bar having its ends rigidly anchored in the side walls 17 and 18 of the housing and having penetrating and cutting teeth extending forwardly from its front edge in position to have the tension span S of the tape impaled thereon in the tape cutting operation. Figures 3, 4 and 13 illustrate one preferred embodiment of this cutter. The bar portion of the cutter is designated 55a, and the teeth projecting forwardly therefrom comprise penetrating portions 55b and severing portions 55c. The tape cutting operation in my machine is preferably a two-stage operation, wherein the tape is first penetrated by sharp prolonged penetrating points, and is then severed at a later stage after this penetrating stage. This two-stage operation affords a desired time and motion interval of the tape for allowing the tape holding spring 56 adequate opportunity to grip the tape at a point just above the point of severance before the complete severance actually occurs. This enables the holding spring 56 to be deflected rearwardly across the tops of the cutter teeth, substantially from the normal position (shown in dotted lines) to the deflected position (shown in full lines) in Figure 7. Immediately upon the complete severance of the tape the spring 56 snaps back to its normal position and holds the end of the supply strip S pressed down against the top of the cutter 55, as clearly shown in Figure 8. Referring now more particularly to this spring, it is preferably of helical form and has its ends secured to or set into retainer brackets or cups 57 which are secured to the side walls 17 and 18 directly above the cutter bar. As shown in Figure 4, the ends of the spring are cocked with the top of each end coil sloping upwardly and inwardly. The purpose of this is to impart a downward bowing or flexure to the bottom of the spring across substantially its entire span so that the bottom of the spring presses downwardly against the tops of the cutter teeth. The end coils of the spring may be soldered or brazed to the retainer brackets 57 at these sloping angles, or the brackets may be constructed somewhat like cups, provided with top and side walls to confine the spring against upward or lateral displacement, and also provided with interior shoulders or sloping end walls which incline the end coils of the spring to produce the downward bowing of the spring against the cutter teeth.

In the embodiment of the cutter, shown in Figures 3 and 4, the severing portions 55c of the teeth are cupped with the concave sides uppermost, as shown in Figure 4. The downward bowing of the holding spring 56 causes the bottom of this spring to press down against the lateral edges of the cupped shearing portions 55c. As pointed out above, the cutting of the tape is a two stage operation in which the very sharp penetrating portions 55b first penetrate the tape. As the tape is pulled further back for impaling itself more deeply over the penetrating points some of the tape material moves rearwardly over each penetrating point and finally crowds rearwardly over each cupped cutting portion 55c. The tape finally becomes completely cut at the bottoms of the sawtooth spaces between the cutter portions 55c, with the result that all of the tape below the line of severing swings down and is pressed into adhesive contact with the work surface by the presser roll 27. That part of the tape remaining above the line of severing has been crowded in under the holding spring 56, such action deflecting the spring rearwardly from the dotted line position shown in Figure 7 to the full line position. A considerable part of each portion of the tape which started rearwardly over the top of each penetrating tooth continues its rearward movement over the tooth and becomes crowded in under the spring 56. When complete severance occurs the spring 56 snaps forwardly and holds this irregular severed edge of the supply strip S pressed down against the tops of the penetrating tooth portions 55b and the cutting tooth portions 55c. Thus, after the cutting of the tape has been completed, the lower end of the supply strip S is held against the top of the cutter element 55 by two holding influences, i. e., first the tacky under side of the tape tends to adhere to the surfaces of the cutter tooth portions 55b and 55c, and, second, the downward bowing pressure of the holding spring 56 tends to hold the tape pressed against the cutter teeth. The combined effect of these two holding influences is less however than the force required to draw additional tape from the supply roll. There are two influences which resist the drawing of additional tape from the supply roll, i. e., first, the pull-away tension required to free the tacky under surface of the tape from its adhesive contact with the next layer in the roll, and second, the drag resistance imposed by the drag spring 48 against rotation of the supply roll. Because the severed end of the tape pulls free from the holding and cutting device more readily than it pulls downwardly from the supply roll, when the tape applying roll 33 swings down to carry the tension span of tape S down against the work surface W, this lower severed extremity pulls loose from the holding and cutting device before any additional amount of tape is pulled downwardly from the supply roll.

I shall now briefly describe the operation of this embodiment of my invention. The work surface W can be deemed to be the surface of a package or box or it can be deemed to be an envelope or any other device resting upon a counter or other supporting surface. Assuming that it is desired to apply a strip of adhesive tape along a certain part of this work surface, the machine is placed at the beginning point of this line of application, with the supply roll end of the housing pointing in the direction in which the machine is to be moved. The operator can have this end of the housing pointing away from himself, in which case he pushes the machine in a direction away from himself, or he can have this end of the housing pointed toward himself, in which case he draws the machine along the line of tape application. The fingers are caused to press downwardly on the presser plate 41 for swinging the tape applying roll 33 downwardly to the dotted line position shown in Figure 1. The roll immediately contacts the outer nonadhesive side of the tension span S, and the continued downward movement of the roll 33 pulls the end of this strip free from the holding and cutting device, whereupon this end is then carried downwardly under the tape applying roll and is brought into adhesive contact with the work surface, as indicated by the dash and dot line position of the tape in Figure 1. Concurrently therewith, the housing is being pushed forwardly, and the adhesive contact of the under side of the tape with the work surface plus the downward pressure exerted by tape applying roll 33 and presser means 27 place a sufficient grip of the tape on the work surface to cause the tape to unreel from the supply roll as the machine is pushed or pulled forwardly in the direction of the arrow X. This tape applying operation is shown more clearly in Fig. 5. When the machine reaches the end of the work surface or the end of the intended line of application of the tape, the finger pressure upon the pressure plate 41 is released so that the tape applying roll 33 can swing upwardly to the normal position shown in Figure 1. The previous movement of the housing is continued, however, so that in such forward movement tension is still maintained on the tape tending to pull it from the supply roll. The immediate effect of swinging the tape applying roll 33 upwardly away from the tape while still continuing to move the machine forwardly is shown in Figure 6. This figure shows the tape in the preliminary stage of the cutting operation wherein the tape impales itself upon the sharp penetrating points 55b of the cutter. The continued forward motion of the machine and the continued action of the presser roll 27 continues to pull the tension span of tape downwardly so that this span impales itself still further along the penetrating points. In the second phase of operation the tape has deflected the holding spring 56 rearwardly substantially to the full line position shown in Figure 7, and finally the tape is completely severed substantially at the bottom of the saw-tooth notches between cutting portions 55c. Thereupon, the holding spring 56 is snapped forwardly, as previously described, and assists in holding the extremity of the tension span S pressed down against the top sides of the cutter teeth, as shown in Figure 8. The continued forward motion of the machine causes the presser roll 27 to roll down the end extremity of the applied strip of tape, as shown in Figure 8. This completes the taping operation and the machine can now be lifted from the work surface. It will be understood that the foregoing is performed as one relatively simple propelling motion wherein the downward force and the propelling force are exerted primarily through the presser plate 41, this being continued until it is desired to cut the tape, whereupon the downward pressure on the presser plate 41 is released but the machine is still pushed forwardly a slight additional distance to cut the tape. If the supply end of the tape should accidentally become loosened from the cutting and holding device it merely swings forwardly into engagement with the secondary holding device 52, as shown in dotted lines, from which position the tape applying roll 33 can still apply the tape to the work surface.

Referring now to the modified construction shown in Figure 9, the general arrangement of the tape supply roll and of the presser roll 27 are substantially the same as above described, and the same reference numerals have been applied to corresponding parts where applicable. The construction of the housing is generally similar, and the supply roll has substantially the same mounting and includes the same arrangement of drag spring 48 for adjustably imposing a friction drag against the unwinding of the tape. Substantially the same arrangement of holding spring and cutter bar is provided in this construction, as above described. The tape applying roll 33 also functions in substantially the same manner, the principal difference residing however in the operating arrangement which causes this tape applying roll to swing downwardly in the tape applying operation. The shaft 34 of this roll 33 has its ends mounted in a swinging bearing frame 61 comprising a transverse back portion 62 and two downwardly extending side arms 63, the shaft 34 being carried between these side arms. The side arms 63 are provided with identical curved cam slots 64 through which extends a stationary transverse rod 65 having its ends fixedly anchored in the side walls 17 and 18 of the housing. Motion is adapted to be imparted to the swinging frame 61 through the medium of an operating lever 67 which is of substantially bell-crank formation and is preferably punched out of flat sheet metal stock. The upper arm 68 of this lever extends out through a slot or opening 43' in the top of the housing and is formed with a bent over end portion 69 to facilitate the application of finger pressure at this end of the lever. The intermediate portion of the lever is pivoted on a transverse pivot rod 71 extending between the side walls 17 and 18 of the housing. A return spring 70 coiled about the pivot rod 71 tends to revolve the lever 67 clockwise into the normal position shown. The other arm 72 of the lever extends forwardly and has a pivotal connection at its end with a pivot pin 73 which is carried in hinge loops 74 formed in the wall 62 of the swinging frame. The lever arm 72 has similar hinge loops for receiving the pivot pin 73. It will be seen from the foregoing that when forward pressure is exerted against the upper end portion 69 of the lever 67, the pivot pin 73 will be swung downwardly and rearwardly relatively to the housing. This motion will carry the swinging frame 61 in a downward direction, and because of the coaction of the cam slots 64 with the stationary rod 65 the arms 63 of the frame 61 will be swung downwardly and forwardly, carrying the tape applying roll 33 downwardly and forwardly into its tape applying position. Such motion of the roll first frees the tension span S of tape from the holding and cutting device and then carries the end of the tension span down into engagement with the work surface in substantially the same manner as described of the preceding embodiment. Concurrently with this downward and forward motion of the tape applying roll, the machine is being pushed or pulled in the forward direction X. At the end of the tape applying operation the finger pressure is removed from the lever portion 69 so as to allow the tape applying roll to swing backwardly and upwardly to its normal position. This allows the tension span of tape to move relatively rearwardly with the continued forward motion of the housing, so that the tape impales itself upon the penetrating portions of the teeth and then severs itself upon the cutting portions of the teeth in the same manner as previously described. If the tension span S should accidentally become loosened from the primary holding device 55—56, it merely swings forwardly into light contact with the secondary holding device 52, as shown in dotted lines in Figure 9, from which position the tape applying roll 53 can still apply this loosened end of the tape against the work surface, so that the normal operation of the machine is not disturbed. It will be recognized therefore that the machine of Figure 1 utilizes a vertical pressure upon the tape applying means while the machine of Figure 9 utilizes a horizontal pressure upon the tape applying means, and these are the principal differences between these two modifications.

Figures 10, 11 and 12 diagrammatically illustrate a stationary embodiment of my improved tape applying machine, wherein the package or article to which the tape is to be applied is passed over the tape applying machine. In this embodiment, 75 indicates the top of a counter or other supporting surface over which the package, box or the like 76 is adapted to be moved in the tape applying operation. An opening 77 is provided in this supporting surface 75, and through this opening operate two axially aligned actuating rollers 78 and a tape applying roller 79. As shown in Figure 12, the two actuating rollers 78 operate on opposite sides of the run of the tape T, while the applying roll 79 operates under this run of the tape. The shafts of these rollers 78 and 79 have supported their ends in a swinging frame 81 which is mounted for swinging movement about a stationary transverse pivot axis 82. The supply roll of tape is suitably supported below the supporting surface 75 and the tension span of the tape is carried up to a cutting and holding assembly 55, 56 which is disposed substantially mid way of the opening 77 just below the top of the supporting surface 75. In the normal position of the parts the actuating rollers 78 project upwardly above the supporting surface 75 in position to be struck by the forward edge of the package 76 as the package is moved over the opening 77, as indicated in dotted lines in Figure 12. The continued motion of the package causes the rollers 78 to be swung rearwardly and downwardly into approximately the position shown in Figure 11. This causes the tape applying roll 79 to be swung upwardly simultaneously therewith for pulling the tension span of tape S free from the holding and cutting device 55, 56, and for thereafter swinging this end of the tape upwardly into engagement with the under side of the package 76, as shown in Figure 11. As soon as the rear edge of the package has passed beyond the actuating rollers 78, these rollers are free to swing upwardly into the normal position shown in Figure 10. Such motion of the rollers is not impeded by the tape because these two rollers operate upon opposite sides of the run of the tape. The tension of the tape pressing downwardly on the tape applying roll 79 creates a rotative force tending to swing the rollers back to their normal positions as soon as the package has passed beyond the actuating rollers 78, and this action may be augmented, if desired, by the provision of spring means tending to swing the frame 81 in a clockwise direction. The instant that the tape applying roller 79 swings downwardly and allows the tape to engage the cutter 55, the tape impales itself upon the penetrating points of the cutter and immediately thereafter the tape cuts itself off against the cutter teeth, in substantially the same manner as described above. The parts have now been restored to their normal positions illustrated in Figure 10. If it is not desired to have the tape extend across the entire fore and aft dimension of the package, the latter can be lifted at any point for the purpose of interrupting the application of adhesive tape at that point. In such event, it will be seen that the actuating rollers 78 are then free to swing upwardly and the tape applying roller 79 to swing downwardly, whereupon the tape span is then permitted to impale itself against the penetrating points for producing the cutting operation.

Figures 13, 14, 15, 16, 17 and 18 illustrate different embodiments of cutters having different relations and proportions of penetrating points and cutting portions. Not all tape will operate with equal efficiency on the same set of cutting teeth. Strong tape, made of fabric or paper, will tend to penetrate further into the teeth before the cutting off operation occurs. Weaker tapes will stand less penetration before parting occurs on the same set of teeth. For example, some "Scotch" tapes having a cellophane base tend to become very weak and brittle after long exposure to a dry atmosphere. In such cases it is recommended by the manufacturers that these brittle tapes be stored in a moist atmosphere for some time in order to restore the original strength and elasticity. However, if such tapes are used while they are still weak and brittle after exposure to dry atmosphere, they tend to tear off along the lines of any initiated hole or puncture, especially when accompanied by pull, and it may be difficult to obtain penetration without rupture unless care is exercised in choosing for the front penetrating part of the cutting teeth a design which will reduce the possibility of premature rupture to a minimum. As pointed out above, it is desirable to have the two-stage operation occur in which the final cutting will not occur until appreciably after the initial penetration, so that the holding function of holding the severed end of the tape on the cutter element will not be impaired. In general, a cutting tooth design which is satisfactory for strong tape may not be satisfactory for weak tape, but a design which is satisfactory for weak tape will also be satisfactory for strong tape. The above explanation also applies to the spacings between the cutting teeth. Strong tape will function satisfactorily (provide a sufficient amount of penetration for holding to occur before rupture or cutting off takes place) with close tooth spacings. Weak tapes, however, require wider tooth spacings. Obviously, the wider tooth spacings are more universally applicable. As previously remarked, the construction shown in Figure 13 corresponds substantially to that shown in Figures 3 and 4. Referring now to the construction shown in Figure 14, more emphasis is placed upon long, narrow penetrating points 55d, and the cutting portions are located at the bottoms of the tooth spaces, as indicated at 55e. In Figure 15, the penetrating points 55f alternate with relatively short or stub-like cutting points 55g. In Figure 16, relatively sharp penetrating points 55h alternate with relatively obtuse cutting points 55i, both of substantially the same height. In Figure 17, a plurality of shorter cutting teeth 55k are interspersed between the longer penetrating teeth 55j. In Figure 18, the penetrating points merely consist of pointed pins or needles 55m which project forwardly from the cutter bar 55a, the forward edge of which then serves as the cutting device if penetration alone has not been sufficient to perform the cutting or severing operation.

Without any intent to be limited to specific dimensions, I consider it appropriate to point out that the minimum total length per cutting tooth which is believed to provide an area sufficient for the functions of both preliminary penetration of the tape followed by cutting is $\frac{1}{16}$ of an inch. The maximum tooth length depends considerably on the size of the taping machine to which it is attached, but can be approximated in the neighborhood of ½ inch. The preferred length seems to be approximately in the range from $\frac{3}{16}$ of an inch to ¼ of an inch. It is not necessary, however, that all the teeth present shall be in the range of sizes mentioned, or that all teeth should be of uniform dimension. It is only necessary that a substantial proportion of the teeth shall be of sufficient length to provide for distinct penetration followed by cutting and holding of the tape end. This does not preclude the possibility that along with these long teeth there may also be present teeth of less than $\frac{1}{16}$ inch length, whose function would be only to help in cutting off the tape, while the work of penetration and holding is left to the longer teeth. The proportions shown in Figures 1 and 9 are fairly close to actual size, but obviously they can be made larger or smaller, as desired. It will be seen that many features of my invention can be utilized in machines constructed for applying other types of tape, such as the water moistened, gummed type of tape; or that my invention can be constructed for using such type of tape. In instances where a sufficient degree of adhesive contact between the tape and the cutter element can be secured without the holding spring 56, this spring may be dispensed with, if desired.

While I have illustrated and described what I regard to be the preferred embodiments of my invention, nevertheless it will be understood that numerous other modifications and rearrangements may be made therein without departing from the essence of the invention.

I claim:

1. A machine for holding a roll of pressure sensitive tape and applying desired lengths of such tape to a work surface, said machine comprising a housing having a mouth, means for supporting said roll in said housing so that tape may be paid out, said housing having a portion defining a forward end of said mouth, said portion and work surface defining a plane, means carried by said housing adjacent the rear end of the mouth for pressing tape against the work surface, a cutter within the housing extending transversely of said housing near the rear portion of the mouth, said cutter having teeth some of which are at least $\frac{1}{16}$ inch long with the teeth pointing generally toward the tape supply, spring means cooperating with the teeth so that the cut end of the tape is retained in position against the teeth in preparation for a new cutting and tape dispensing cycle, a tape applier having at least an edge for cooperation with the non-adhesive side of tape, means for mounting said applier so that it normally rests well within the housing remote from the work surface but is freely movable to an active position toward the work surface so that the applying edge reaches the plane of the housing mouth at a point between the forward end of the mouth and the projection of the teeth upon the mouth, said tape applier being adapted to deflect the tape out of a tension span extending between the tape roll and teeth and into contact with the work surface, said tape applier when returned to a normal position at the end of a tape applying operation allowing the tape to assume a tension span and thus force the tape against the cutter teeth during forward movement of the machine to result in severance of the tape.

2. The device according to claim 1 wherein additional tape holding means are provided within the housing at the forward end of the mouth for cooperating with the adhesive side of the tape to support the tape in the event that the tape end works loose from the spring and cutter after severance so that the severed end of the tape is always retained within the housing.

3. In a machine for applying adhesive tape a housing having a mouth, a pressing roll carried by said housing at the rear end of the mouth, a tape supply carried by said housing at the forward end thereof in the interior with the tape extending to said mouth, a movable frame carried by said housing, a roller carried by said frame, said frame being movable to move said roller from a normal position well within the housing to an active position at the mouth of said housing, in active position said two rollers defining a work surface plane along which tape is applied, a transverse cutter carried by said housing, said cutter being disposed between the tape pressing roll and the active position of the second roll but being within the housing and having teeth and having some teeth at least $\frac{1}{16}$ inch long pointing toward the tape supply, said cutter being positioned so that the teeth intersect a tension span of tape between the tape pressing roller and the tape supply in the normal position of the second roller, spring means for cooperating with the teeth to grip the cut end of the tape and maintain the same against the cutter whereby when said machine is moved forward relative to said work surface, the cutter retaining the cut end of the tape has the cut end of the tape removed from the cutter by the second roller being moved into active position into contact with the applied tape extending along the work surface between the two rollers and when the taping operation is to be completed with the second roller raised to an inactive position, a tension span in the tape is created with the span of the tape being pressed into the cutter teeth with further forward movement of the machine causing the teeth to cut the tape.

4. A machine for holding a roll of pressure sensitive tape and applying desired lengths of such tape to a work surface, said machine comprising a housing having a mouth, means for supporting said roll in said housing so that tape may be paid out under tension, said housing having a portion defining a forward end of said mouth, said portion and work surface defining a plane, a cutter carried by the housing and extending transversely of said housing near the rear portion of the mouth, said cutter having some teeth at least $\frac{1}{16}$ inch long with the teeth pointing generally toward the tape supply, a spring for retaining a freshly cut tape end against the cutter teeth, a tape applier having at least an edge for cooperation with the non-adhesive side of tape, means for mounting said applier so that it normally rests well within the housing remote from the work surface but is freely movable to an active position toward the work surface so that the applying edge reaches the plane of the housing mouth to bear against the non-adhesive side of the tape somewhat to the rear of the forward end of the mouth, said tape applier being adapted to deflect the tape out of a tension span extending between the tape roll and the teeth with the tape being deflected into contact with the work surface, said tape applier when returned to a normal position at the end of a tape applying operation allowing the tape to assume a tension span and thus force the tape against the cutter teeth during forward movement of machine to result in severance of the tape.

5. The structure according to claim 4 wherein said housing carries at the forward end of the mouth a secondary holding means for cooperation with the adhesive side of the tape, said secondary holder being adapted to support the tape only upon failure of the cutter to retain the tape after severance whereby the loose end of the tape is maintained within the housing until pushed forward by the tape applying means.

SAMUEL H. BOBROV.

REFERENCES CITED

The following references are of record in the file of this patent:

UNITED STATES PATENTS

| Number | Name | Date |
|---|---|---|
| 2,235,704 | Gorbatenko et al. | Mar. 18, 1941 |
| 2,404,317 | Salfisberg | July 16, 1946 |
| 2,452,584 | Luebkeman | Nov. 2, 1948 |